United States Patent [19]

Mori et al.

[11] Patent Number: 5,504,870

[45] Date of Patent: Apr. 2, 1996

[54] BRANCH PREDICTION DEVICE ENABLING SIMULTANEOUS ACCESS TO A CONTENT-ADDRESSED MEMORY FOR RETRIEVAL AND REGISTRATION

[75] Inventors: Junji Mori, Fujisawa; Mitsuo Saito, Yokosuka, both of Japan

[73] Assignee: Kabushiki Kaisha Toshiba, Kawasaki, Japan

[21] Appl. No.: 448,180

[22] Filed: May 23, 1995

Related U.S. Application Data

[63] Continuation of Ser. No. 870,963, Apr. 20, 1992, abandoned.

[30] Foreign Application Priority Data

Apr. 22, 1991 [JP] Japan ..................... 3-090515

[51] Int. Cl.⁶ ........................................... G06F 9/38
[52] U.S. Cl. ..................... 395/375; 364/DIG. 1
[58] Field of Search ..................... 395/375, 250, 395/800; 365/49

[56] References Cited

U.S. PATENT DOCUMENTS

| | | | |
|---|---|---|---|
| 4,777,594 | 10/1988 | Jones et al. | 395/375 |
| 4,860,197 | 8/1989 | Langendorf et al. | 395/375 |
| 4,894,772 | 1/1990 | Langendorf | 395/375 |
| 4,912,635 | 3/1990 | Nishimukai et al. | 395/375 |
| 4,984,154 | 1/1991 | Hanatani et al. | 395/375 |
| 5,193,156 | 3/1993 | Yoshida et al. | 395/375 |
| 5,226,005 | 7/1993 | Lee et al. | 365/49 |
| 5,230,068 | 7/1993 | Van Dyke et al. | 395/375 |

*Primary Examiner*—William M. Treat
*Attorney, Agent, or Firm*—Foley & Lardner

[57] ABSTRACT

The branch prediction device of this invention is for use in a pipeline processor where a plurality of instructions are simultaneously processed in various stages, such as the fetch stage, execution stage, memory access stage and register write stage. A two-port branch prediction buffer enables simultaneous operation of the registration and retrieval processes so that a previously registered address can be obtained during the same clock pulse as registration of another branch address occurs.

3 Claims, 6 Drawing Sheets

F I G. 3
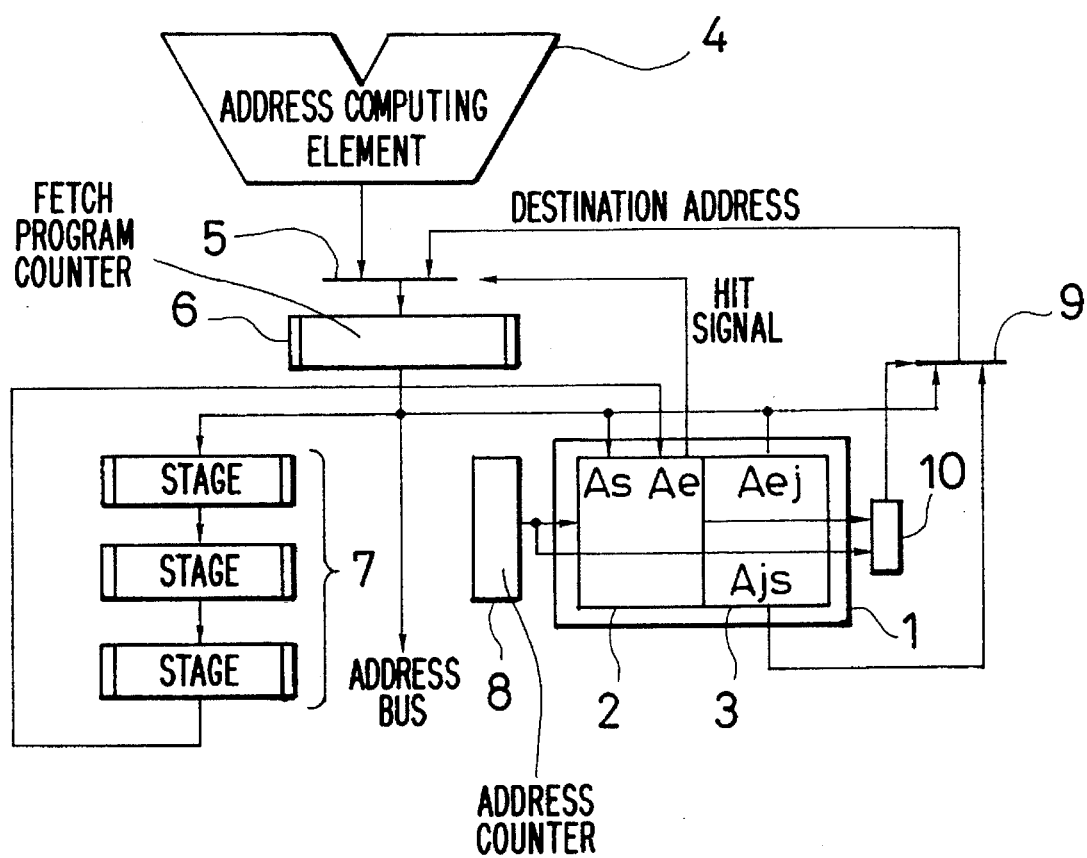

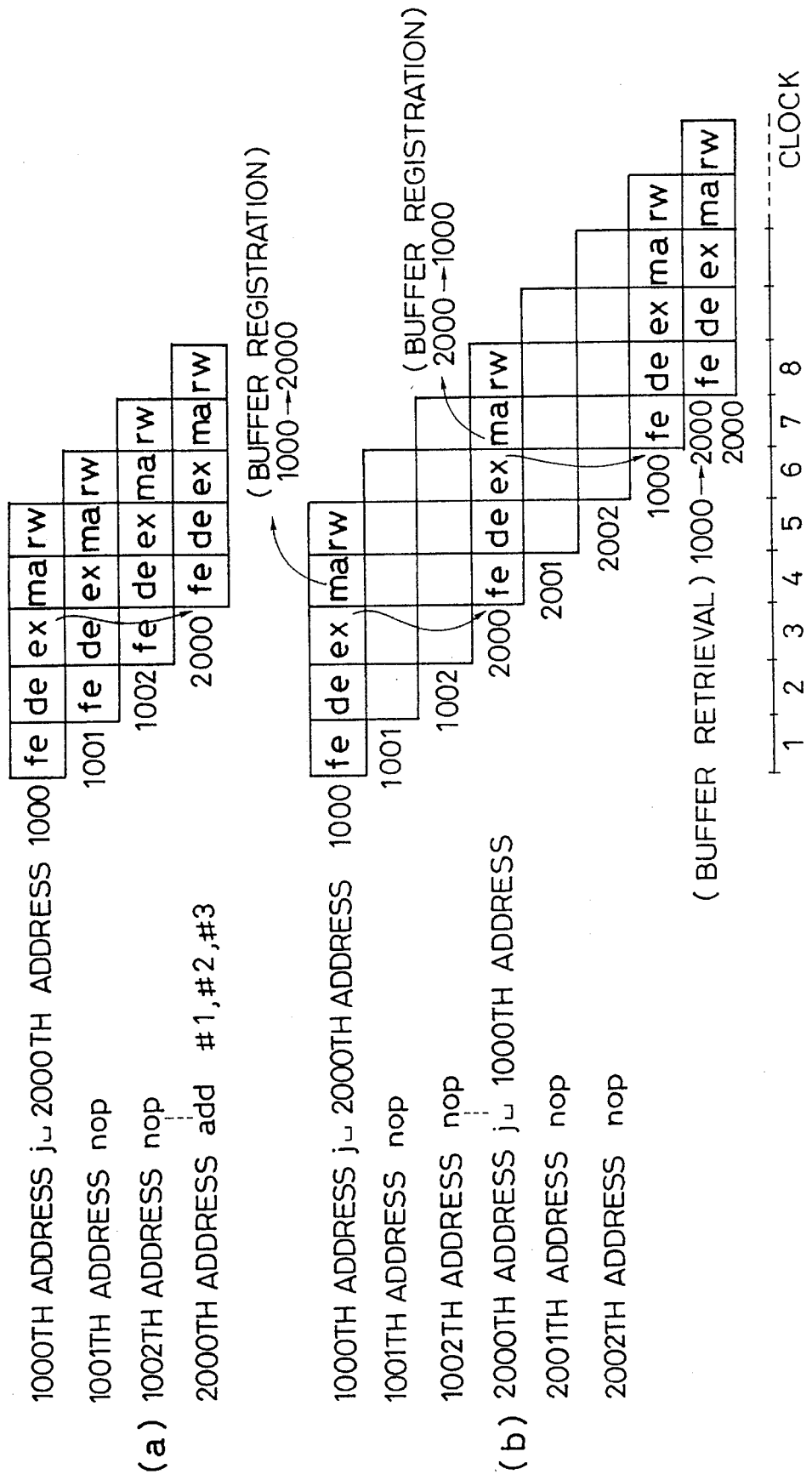

5,504,870

BRANCH PREDICTION DEVICE ENABLING SIMULTANEOUS ACCESS TO A CONTENT-ADDRESSED MEMORY FOR RETRIEVAL AND REGISTRATION

This application is a continuation of application Ser. No. 07/870,963, filed Apr. 20, 1992, now abandoned.

BACKGROUND OF THE INVENTION

1. Field of the Invention

This invention relates to a device for executing branch prediction in an information processing system where a plurality of instructions are read out one after another from a memory and executed in sequence.

2. Description of the Prior Arts

In a pipeline processing of a large computer system, branch prediction is adopted to decrease the disorder of pipelines which occurs usually at the generation of a branch instruction. In recent years, such branch prediction has become used in a one chip micro-computer which uses a pipeline processing.

Next, a branch prediction system will be explained.

As shown in FIG. 6a, in a pipeline processing, a plurality of stages, such as a fetch stage (fe), a decode stage (de), and an execution stage (ex), are carried out with synchronous to clocks. In this processing, if the instruction in the 1000th address under fetch is a branch instruction, the destination address (for example, 2000th address) of this branch instruction is calculated at the execution stage (ex) which takes place in the third clock. As a result, two instructions in the 1001st and 1002nd addresses, that is, two instructions occurred right after the branch instruction, should be treated as delayed slot data, in order to avoid the disorder of pipelines. Accordingly, although the branch instruction is a conditional one, and therefore, the generation of branching is not sure, executable instructions, such as no-operation instructions, should be placed after the branch instruction. This fact makes programing complicated and time consuming.

To overcome the above mentioned disadvantage, conventional branch prediction devices have the following function. That is, once a branch instruction is fetched, its assignment and destination addresses are registered and stored. Accordingly, if the same instruction specified by said registered address is fetched again, the destination address of this instruction is immediately obtained from the registered and stored values.

Concretely, in case of a pipeline processing shown in FIG. 6b, the branch instruction in the 1000th address is fetched at the first clock. The destination address 2000th address) of this instruction is calculated at the execution stage (ex) in the third clock. Then, at the registration stage (ma) in the fourth clock, the 1000th address, which is the assignment address for the branch instruction, and the 2000th address, which is the destination address of this branch instruction, are registered in a branch prediction buffer comprised of a content-addressed memory (CAM).

If the instruction, which is fetched at the fourth clock and specified by said calculated destination address, is a branch instruction, its destination address (1000th address) is calculated at the sixth clock. Then, at the seventh clock, the address (2000th address) whereby the branch instruction is specified, and its destination address (1000th address) are registered.

In parallel with the above mentioned process, a retrieval of the calculated destination address (1000th address) is also started at the seventh clock in the branch prediction buffer. In this case, because the 1000th address has been already registered in the buffer, its destination address (2000th address) is expected to be found immediately.

In conventional branch prediction buffers, however, it is not possible to execute both of a retrieval and a registration simultaneously. Accordingly, in the pipeline process shown in FIG. 6b, only the registration is executed in the seventh clock. In the situation mentioned above, therefore, the destination address cannot be obtained immediately, thus lowering the process speed of the branch prediction.

The above mentioned disadvantage becomes more serious in a super Keller processor, in which a plurality of instructions are executed simultaneously and which has a high possibility for finding a branch instruction in a destination address.

As described above, in an information processing system in which instructions are read out one after another and executed in sequence, the prior branch prediction device cannot execute both of a registration and a retrieval simultaneously in every clock. As a result, branch prediction cannot work efficiently in said system, thus lowering the throughput and the processing speed of the system.

SUMMARY OF THE INVENTION

This invention has been made to overcome the above mentioned problem of the prior art branch prediction device.

Therefore, the main object of the present invention is to provide a branch prediction device which is capable of executing a registration and a retrieval simultaneously in a branch prediction process.

Another object of the present invention is to improve the efficiency of branch prediction in a branch prediction device, and so, to achieve a high speed processing in an information processing system.

In order to realize the above mentioned objects, this invention provides a branch prediction device which is comprised of the following: means for computing the address of an instruction which is fetched to be executed from a memory; means for holding said computed address; means for delaying the output address from said holding means until the destination address of a branch instruction which is specified by said address held in said holding means is calculated by said address computing means and input to said holding means; branch prediction means having a registration and comparison part in which a plurality of addresses to specify branch instruction are registered and compared, and also having an information part in which destination addresses of branch instructions are registered; and means for selecting either the output from said information part or the output from said computing means; said registration and comparison part being connected to the output of said holding means in order to execute a comparing retrieval of the output address from said holding means, and also connected to the output of said delaying means in order to execute a registration of the output: address from said delaying means; said information part being connected to the output of said holding means in order to execute a registration of said destination address; and wherein said destination address obtained from said information part is input to said holding means through said selecting means, only when a coincidence retrieval is obtained as the result of said retrieval in said registration and comparison part.

According to said structure, a retrieval to detect whether the address of a branch instruction to be executed is already registered as a branch instruction address or not, and a registration of the address of said branch instruction and its destination address can be carried out simultaneously.

These and other objectives, features, and advantages of the present invention will be more apparent from the following detailed description of preferred embodiments in conjunction with the accompanying drawings.

BRIEF DESCRIPTION OF THE DRAWINGS

FIG. 3 is a block diagram showing the structure of a branch prediction device according to the second embodiment of the present invention;

FIGS. 6(a and b) are views explaining the process of a branch instruction in a pipeline processing system.

DETAILED DESCRIPTION OF THE EMBODIMENTS

Preferred embodiments of the present invention will be described next with referring to figures.

Figure 1:
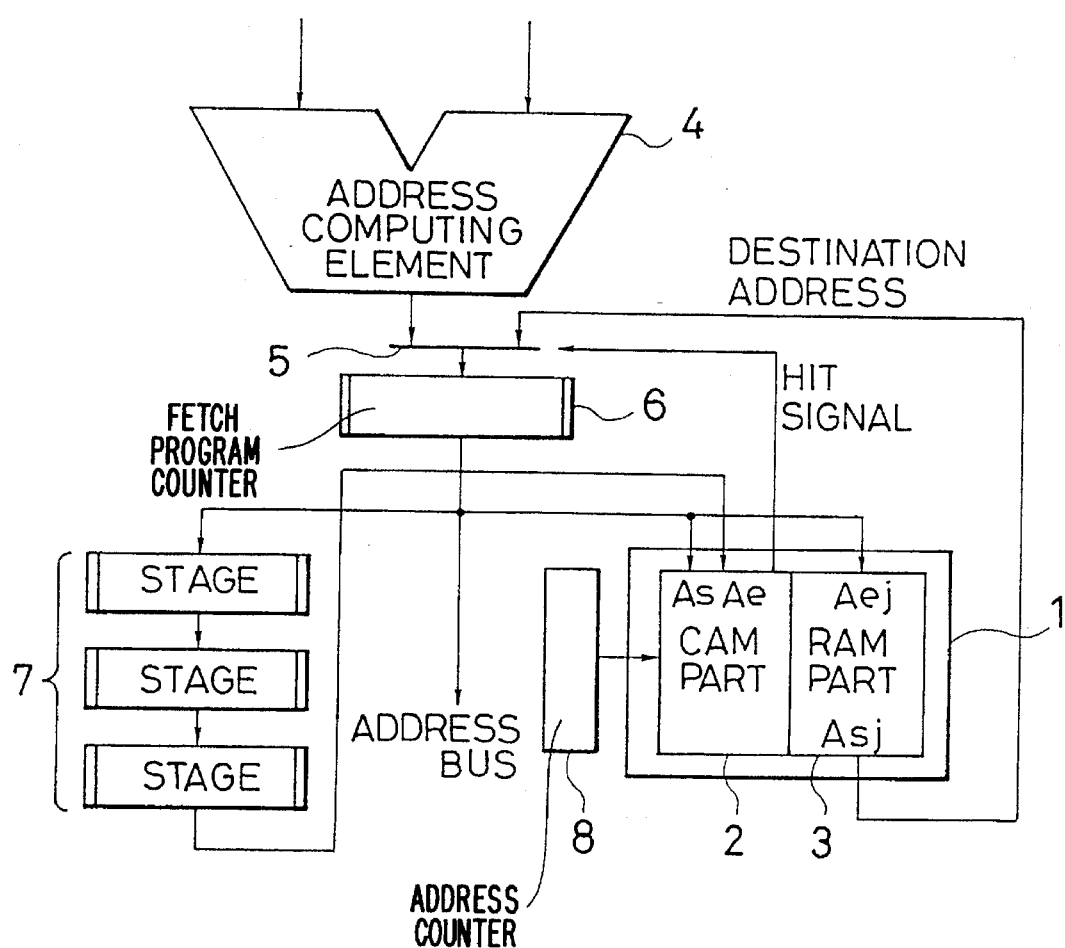
FIG. 1 is a block diagram showing the structure of a branch prediction device according to the first embodiment of the present invention.

FIG. 1 shows the structure of a branch prediction device according to the first embodiment of the present invention. As shown in FIG. 1, the branch prediction device is mainly comprised of the following: a branch prediction buffer (BTB) 1; an address computing element 4; a fetch address counter 6; and a pipeline register group 7.

Figure 2:
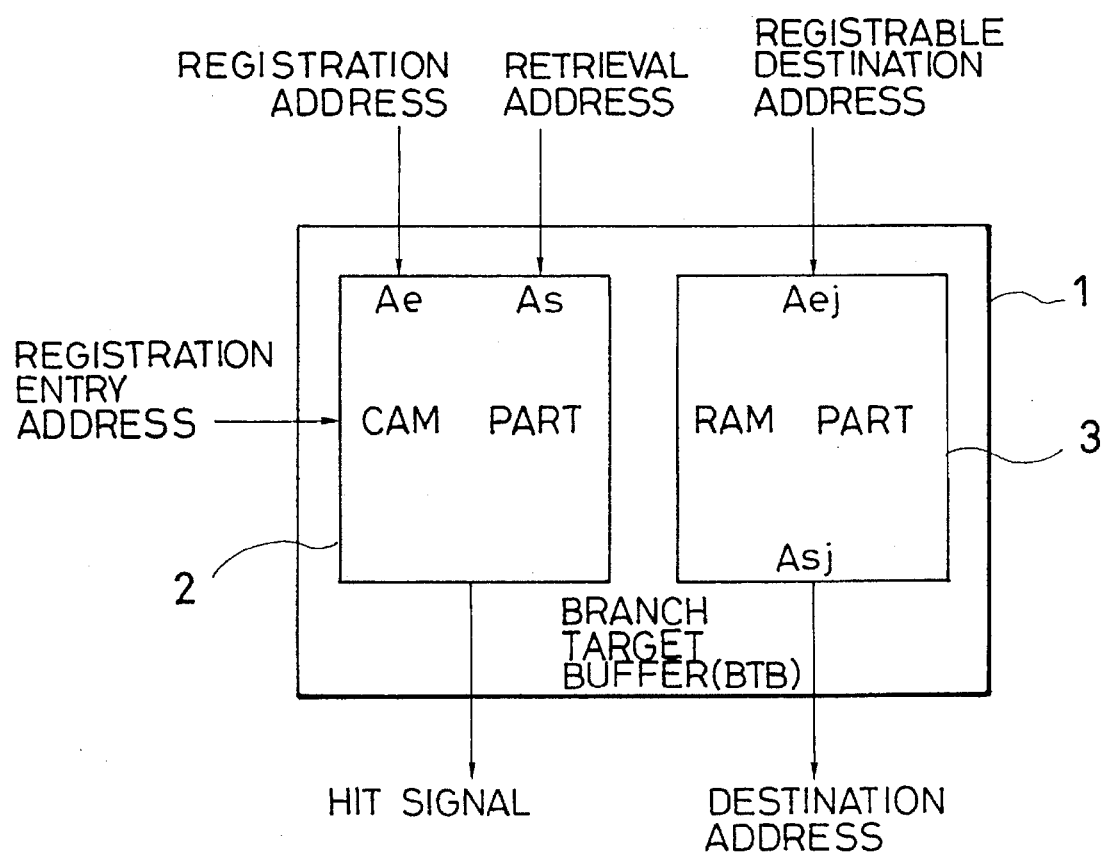
FIG. 2 is a block diagram showing the details of the branch prediction means shown in FIG. 1.

As shown in FIG. 2, branch prediction buffer 1 is comprised of a content,addressed memory (CAM) in which a registration and comparison part (CAM) 2 and an information part (RAM) 3 are included. In this part 2, registration addresses (Ae), whereby branch instructions are specified, are registered into registration entry addresses which are given by an address counter 8. Also, a retrieval to find whether an address given to be a retrieval address (As) is already registered or not, is carried out in part 2 by comparing said retrieval address with said registered addresses. At this time, if the retrieval address s found among the registered addresses, a hit signal is outputs from part 2.

In information part 3, destination addresses of branch instructions, which are specified by registered addresses in part 2, are registered as registerable destination addresses (Aej). When a coincidence retrieval is obtained in part 2, the destination address (Asj) corresponding to the branch instruction specified by said retrieval address is output from information part 3, and this is given to address fetch counter 6 thorough selector 5.

In said branch prediction buffer 1, there are two kind of bit lines provided to the content-addressed memory which forms buffer 1. These are the registration bit line and the registration bit line. By way of this registration bit line, said registration address (Ae) is input and registered to part 2. On the other hand, said retrieval address (As) is input to part 2 by way of the retrieval bit line in order to execute a retrieval.

In a case where both of a registration and a retrieval occur simultaneously on the same entry in part 2, the registration takes the precedence of the retrieval.

In the branch prediction device having said branch prediction buffer 1, a calculated address by address computing element 4 is input to address fetch counter 6 through selector 5. The address is, then, given to address bus to fetch and execute an instruction.

At the same time, said address stored in fetch address counter 6 is given to part 2 in branch prediction buffer 1 as a retrieval address (As), in order to execute a comparing retrieval. When a coincidence retrieval is detected as the result of said comparing retrieval, the destination address of a branch instruction which is specified by said retrieval address, is output from part 3 and given to selector 5. In this case, because a hit signal is given to selector 5, said destination address is selected in selector 5 and given to address fetch counter 6. As a result, as soon as to fetch a branch instruction, the destination address of the branch instruction is obtained.

In parallel to said process, said address stored in fetch address counter 6 is also given to pipeline register group 7. Because pipeline register group 7 is comprised of three registers corresponding to a decode (de) stage, an execution (ex) stage, and a registration (ma) stage of a pipeline processing, said address is delayed by 3 clocks at the output of register group 7. In other words, the address stored in fetch address counter 6 is delayed by pipeline register group 7 until the destination address of a branch instruction, Which is fetched by the address stored in fetch address counter 6, is calculated by address computing element 4 in the execution stage of the pipeline process and stored in fetch address counter 6.

The address delayed by pipeline register group 7 is, then, input to part 2 as a registration address (Ae). As described above, by the time when the registration address is given to part 2, three clocks have already passed after it was held in fetch address counter 6. Therefore, the destination address of a branch instruction, which is specified by the registration address, has been stored in fetch address counter 6 by that time. This address stored in counter 6 is then given to part 3 as a registerable destination address.

In said situation, that is, when a registration address is given to part 2 and a registerable destination address is given to part 3, these addresses can be registered into buffer 1 respectively only if a registration enable signal (not shown) becomes an enable state.

As described above, in the branch prediction device of this embodiment, a registration and a retrieval of an address can be executed simultaneously. As a result, retrievals can be carried out in every clock, thus strongly improving the efficiency of branch prediction. At the same time, unused time during the operation of a branch instruction is reduced, and so, the processing speed of this device is greatly improved.

FIG. 3 shows the structure of a branch prediction device according to the second embodiment of the present invention. In the FIGS. 3, 4, and 5 described below, the same numbers as those shown in FIG. 1 indicate the same or the similar structure elements, so that the explanation of these elements will be omitted.

The device shown in FIG. 3 is characterized by the following structure. That is, in a comparator 10, a registration entry address in part 2 is compared with a registration address which is obtained by a coincidence retrieval. Once said two addresses coincide with each other, a coincidence signal is given to selector 9. According to this coincidence signal, selector 9 chooses the address held in fetch address counter 6 instead of the destination address which is output from information part 3, and gives it to fetch address counter 6 as a destination address. As a result, the same or the similar advantages as those of the devices according to the first embodiment can be obtained.

Figure 4:
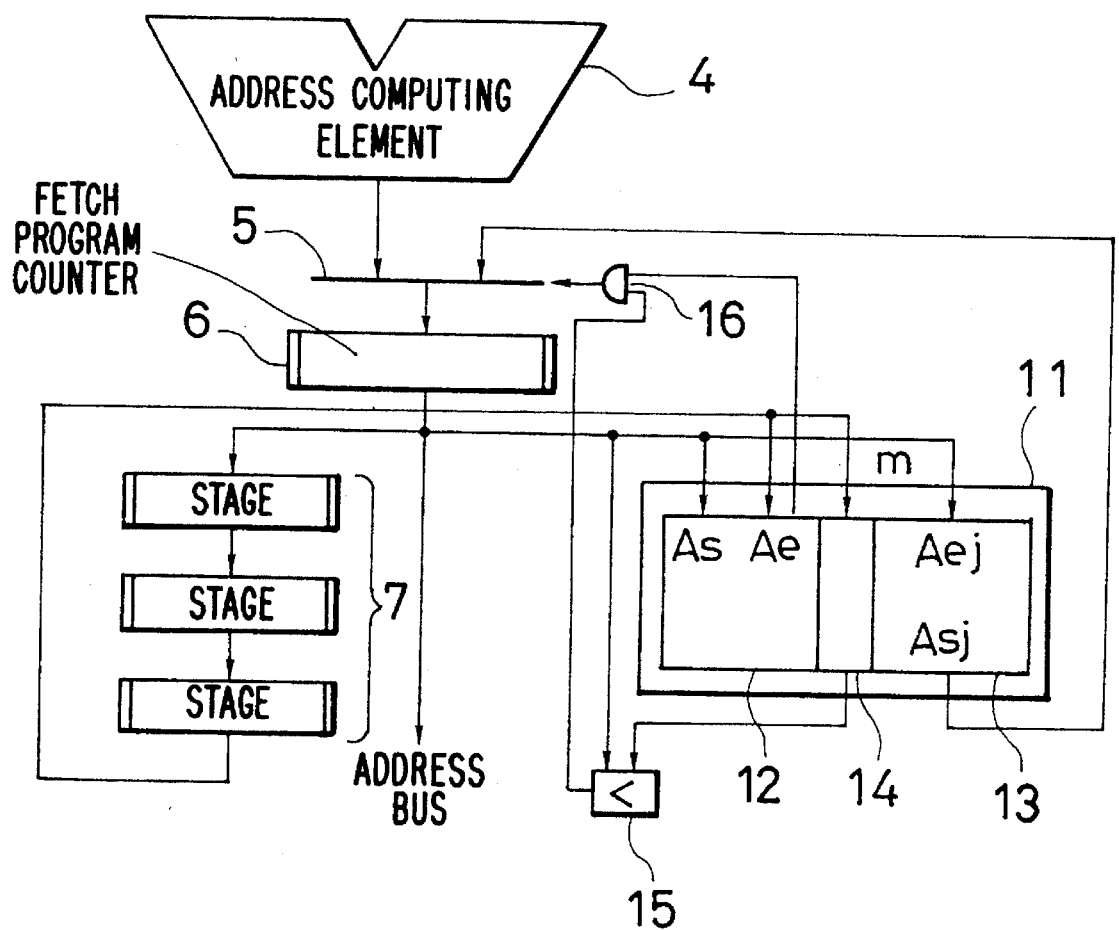
FIG. 4 is a block diagram showing the structure of a branch prediction device according to the third embodiment of the present invention.

FIG. 4 shows the structure of a branch prediction device according to the third embodiment of the present invention.

Figure 5:
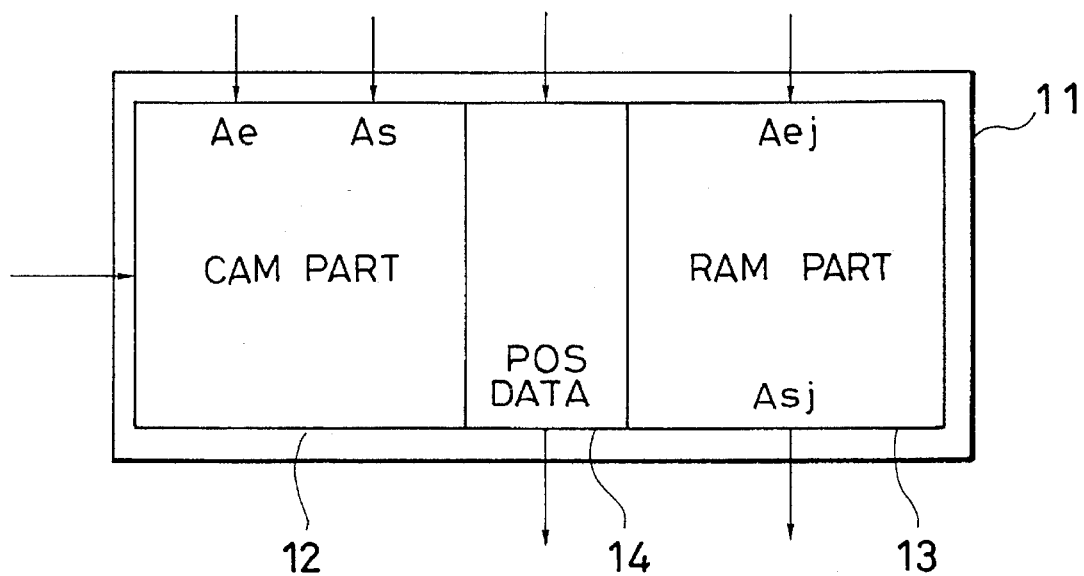
FIG. 5 is a block diagram showing the details of the branch prediction means shown in FIG. 4.

The device shown in FIG. 4 is characterized by the following fact. That is, the device can be applied to information processing systems in which a plurality of instructions can be fetched and executed simultaneously. To this end, as shown in FIG. 5, branch prediction buffer (BTB) 11 is comprised of the following: a registration and comparison part 12: an information part 13: and a POS data part 14. In this part 14, information regarding the rank of a branch instruction among a plurality of instructions under fetch is registered. Furthermore, in comparator 15, the respective size of the lower m bits of a registration address, which is output from pipeline register group 7 and registered into part 14, are compared with those of an address stored in fetch address register 6. In such a state, if a condition, that is, the content registered in POS data part 14 is smaller than that stored in fetch address counter 6, is satisfied, a hit signal is output from AND gate 16 and given to selector 5.

According to the above mentioned embodiment, it is possible to find a branch instruction among a plurality of instructions which are fetched simultaneously, and to execute the branch prediction. This is, therefore, a great advantage for processors in which a plurality of instructions are executed simultaneously, such as the super Keller processor.

In summary, according to the branch prediction device of the present invention, a retrieval and a registration of addresses in branch prediction can be executed simultaneously. A retrieval can, therefore, be carried out in every clock, thus greatly improving the validity of branch prediction. As a result, a branch prediction device, which is capable of realizing an information processing system having high throughput and a high processing speed, can be obtained according to the present invention.

What is claimed is:

1. In a processing system including an address computing element coupled to a fetch program counter via a selector, a branch prediction buffer comprising:

a registration and comparison part;

an information part;

a first data line connecting a retrieval address input of the registration and comparison part and a destination input of the information part to an output of the fetch program counter;

a second data line connecting a registration address input of the registration and comparison part to a delayed output of the fetch program counter;

a third data line connecting an output of the information part to an input of the selector; and a hit signal line connecting a hit signal output of the registration and comparison part to a hit input of the selector, wherein a destination address identifying a specific address is provided to the destination input in concert with a corresponding registration address being provided to the registration address input to complete a registration operation at the same time as the specific address is provided to the retrieval address input to conduct a retrieval operation.

2. A processing system comprising:

an address computing element;

a fetch program counter;

a selector coupling the fetch program counter to the address computing element;

a branch prediction buffer including a registration and comparison part and an information part;

a first data line connecting a retrieval address input of the registration and comparison part and a destination input of the information part to an output of the fetch program counter;

a second data line connecting a registration address input of the registration and comparison part to a delayed output of the fetch program counter;

a third data line connecting an output of the information part to an input of the selector; and a hit signal line connecting a hit signal output of the registration and comparison part to a hit input of the selector, wherein a destination address identifying a specific address is provided to the destination input in concert with a corresponding registration address being provided to the registration address input to complete a registration operation at the same time as the specific address is provided to the retrieval address input to conduct a retrieval operation.

3. The processing system of claim 2, further comprising delay means having an input connected to the fetch program counter and an output connected to the second data line, the delay means delaying a registration address received from the fetch program counter so that the registration address is provided to the registration address input in concert with the corresponding destination address.

\* \* \* \* \*